(12) United States Patent
Fusari et al.

(10) Patent No.: US 10,232,666 B2
(45) Date of Patent: Mar. 19, 2019

(54) DEVICE FOR MOUNTING A WHEEL ON A BICYCLE FRAME

(71) Applicant: Campagnolo S.r.l., Vicenza (IT)

(72) Inventors: Flavio Fusari, Vicenza (IT); Andrea Greco, Vicenza (IT)

(73) Assignee: Campagnolo S.r.l., Vicenza (IT)

( * ) Notice: Subject to any disclaimer, the term of this patent is extended or adjusted under 35 U.S.C. 154(b) by 179 days.

(21) Appl. No.: 15/455,840

(22) Filed: Mar. 10, 2017

(65) Prior Publication Data

US 2017/0259616 A1    Sep. 14, 2017

(30) Foreign Application Priority Data

Mar. 11, 2016  (IT) .............................. UA2016A1561

(51) Int. Cl.
*B60B 27/02*  (2006.01)
*B62K 25/02*  (2006.01)

(52) U.S. Cl.
CPC ............ *B60B 27/026* (2013.01); *B62K 25/02* (2013.01); *B60B 2900/114* (2013.01); *B62K 2025/025* (2013.01); *B62K 2206/00* (2013.01)

(58) Field of Classification Search
CPC . B60B 27/026; B60B 2900/114; B62K 25/02; B62K 2025/025; B62K 2206/06
USPC .......................................... 301/110.5, 124.2
See application file for complete search history.

(56) References Cited

U.S. PATENT DOCUMENTS

| 7,562,943 | B2 | 7/2009 | Kanehisa |
| 8,267,484 | B2 | 9/2012 | Lüde |
| 2005/0110335 | A1* | 5/2005 | Rose ....................... B62K 25/02 301/124.1 |
| 2008/0191545 | A1 | 8/2008 | Laird |
| 2013/0119633 | A1* | 5/2013 | Klieber ................... B60B 1/003 280/281.1 |
| 2015/0054254 | A1 | 2/2015 | Spahr |
| 2015/0069827 | A1* | 3/2015 | Nakajima .............. B62K 25/02 301/124.2 |

(Continued)

FOREIGN PATENT DOCUMENTS

GB    2538223 A    11/2016

OTHER PUBLICATIONS

Italian Search Report and Written Opinion in Italian Application No. UA2016A001561, dated Feb. 13, 2017, with English translation.

*Primary Examiner* — S. Joseph Morano
*Assistant Examiner* — Jean W Charleston
(74) *Attorney, Agent, or Firm* — Volpe and Koenig, P.C.

(57) ABSTRACT

The device for mounting a bicycle wheel comprises a pin having a longitudinal axial through hole. A first free end portion of the pin has a threading. A second free end has a pin head. A lever for rotating the pin is housed in the axial through hole and is axially moveable between two operative positions. The lever has a first lever element housed in the axial through hole in the two operative positions, and a second lever element, pivoted to the first lever element about an axis perpendicular to the longitudinal axis, that is housed in the axial through hole when the lever is a first operative position, and that is positioned outside the axial through hole when the lever is in a second operative position for allowing a torque transfer between lever and pin following the rotation of the second lever element about the longitudinal axis.

13 Claims, 11 Drawing Sheets

(56) References Cited

U.S. PATENT DOCUMENTS

2016/0052588 A1\* 2/2016 Walthert ............... B60B 27/026
280/210

\* cited by examiner

DEVICE FOR MOUNTING A WHEEL ON A BICYCLE FRAME

CROSS REFERENCE TO RELATED APPLICATION(S)

This application claims the benefit of Italian Application No. UA2016A001561, filed on Mar. 11, 2016 and is incorporated herein by reference as if fully set forth.

FIELD OF INVENTION

The present invention relates to a device for mounting a wheel on a bicycle frame.

BACKGROUND

Preferably, the aforementioned mounting device is used for mounting a wheel on a racing bicycle, but the use of this device in any other type of bicycle is foreseen as well.

As known, the front and rear wheels of a bicycle are mounted on the frame of the bicycle at a respective fork (front and/or rear) of the frame.

The mounting of the wheel on the frame of the bicycle takes place by coupling the hub of the wheel with the respective fork.

The hub typically comprises a hub body extending along a longitudinal axis and provided with attachment flanges for attaching the spokes of the wheel and the brake disc, if any. The hub body has an axial through cavity in which a pin is housed. The hub body is rotatable with respect to the pin about the aforementioned longitudinal axis.

The pin has opposite axial end portions, at each of which a respective arm of the fork is intended to be stably coupled.

In some conventional embodiments, the pin comprises, at one of the opposite axial end portions thereof, an outer threading configured to be coupled with an inner threading made directly in the arm of the fork. Alternatively, the outer threading of the pin can be coupled with an inner threading made on a cap configured to go into axial abutment against an outer wall of the arm of the fork.

The pin further comprises, at the opposite axial end portion, a locking lever configured to allow the aforementioned outer threading to be screwed into the arm of the fork (or into the cap) and the subsequent locking of the wheel with respect to the frame of the bicycle.

In this respect, the locking lever rotates as a unit with the pin about the aforementioned longitudinal axis and is pivoted to the pin through a cam mechanism at a pivoting axis. The locking lever is further in abutment against an abutment surface provided in the pin and configured to go into abutment with the other arm of the fork.

The screwing of the pin in the inner threading of the arm of the fork (or of the cap) takes place by rotating the locking lever about the aforementioned longitudinal axis. Such screwing causes the pin to be locked with respect to the arm of the fork. The subsequent rotation of the locking lever about the pivoting axis, thanks to the cam mechanism, causes the forced axial abutment of the aforementioned abutment surface against the other arm of the fork and, consequently, the locking of the wheel on the fork.

Pins of the type discussed above are described for example in U.S. Pat. No. 7,562,943 and U.S. Pat. No. 8,267,484.

The Applicant observed that in the pins described above the locking lever projects axially with respect to the arm of the fork by a non-negligible axial length (typically by many centimeters). This is not desired by some cyclists and/or users, particularly in the field of racing bicycles.

The technical problem at the basis of the present invention is therefore to provide cyclists and/or users with a device for mounting the wheel on the bicycle frame that, in addition to allow a quick and easy mounting of wheels on bicycle frames, overcomes the aforementioned drawback.

The Applicant believes that the axial projection discussed above is at least partially caused by the presence of the cam mechanism and has therefore thought to a solution wherein no cam mechanism is used.

SUMMARY

The wheel mounting device comprises a pin extending along a longitudinal axis (X) and having an axial through hole. The pin, at a first free end portion thereof, has a threading and, at a second free end portion thereof, a pin head. A lever for rotating the pin is housed in the axial through hole. The lever has a first lever element housed in the axial through hole in a first operative position and a second operative position, and a second lever element pivoted to the first lever element about a pivoting axis (Y) perpendicular to the longitudinal axis (X). The second lever element is housed in the axial through hole when the lever is in the first operative position, and is outside the axial through hole when the lever is in said second operative position. In this last position, the second lever element can be rotated with respect to the first lever element about the pivoting axis and at least one of the first lever element and the second lever element is coupled with the pin through a shape coupling, allowing a torque transfer between the lever and pin following the rotation of the second lever element about the longitudinal axis (X).

BRIEF DESCRIPTION OF THE DRAWING(S)

Further features and advantages of the present invention will become clearer from the following detailed description of some preferred embodiments thereof, made with reference to the attached drawings and given for indicating and not limiting purposes. In such drawings.

Figure 1:
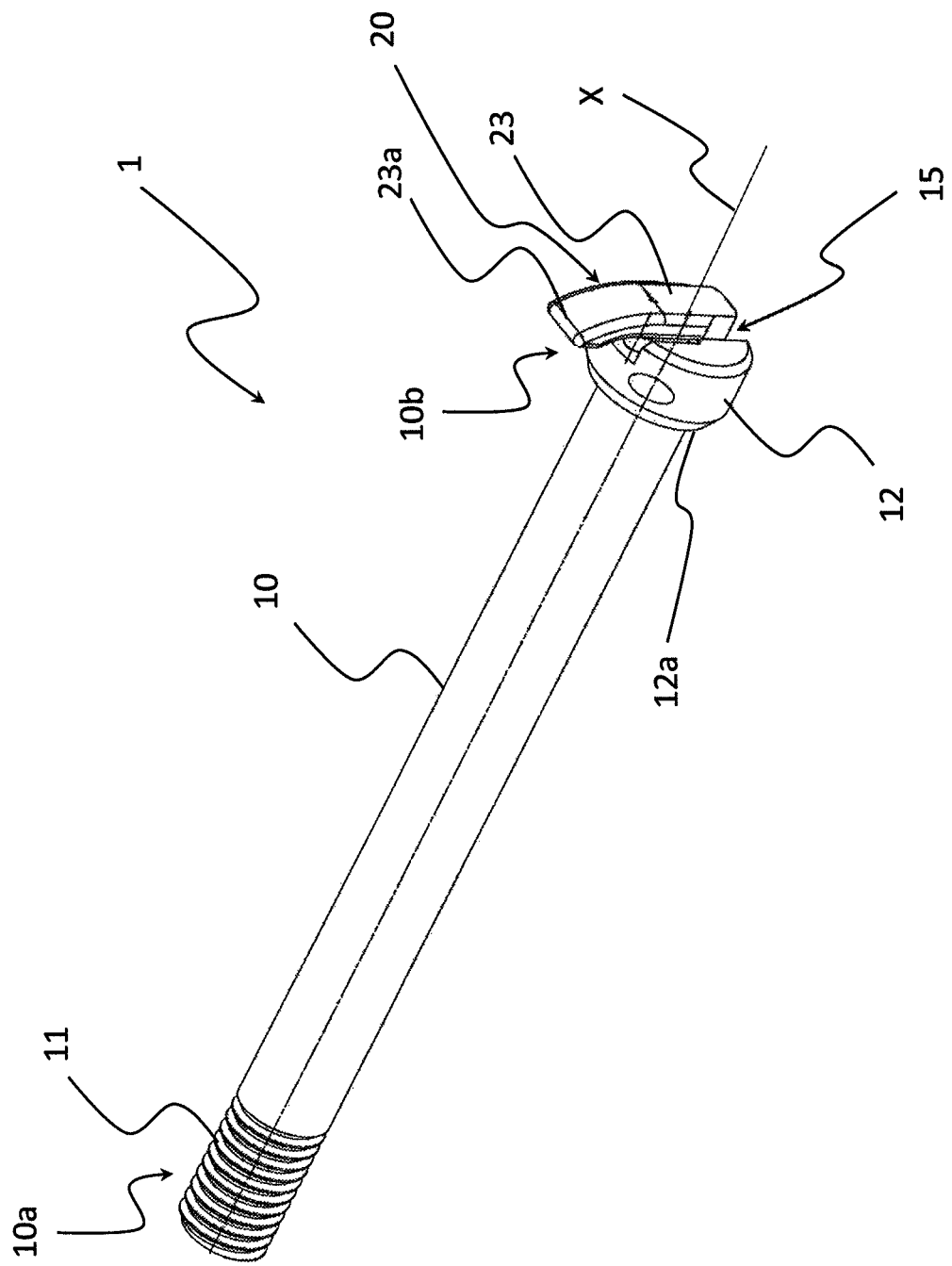
FIG. 1 is a perspective view of a first preferred embodiment of a device for mounting a wheel on a bicycle frame, such a device being in accordance with the present invention.

DETAILED DESCRIPTION OF THE
PREFERRED EMBODIMENT(S)

The present invention relates to a device for mounting a wheel on a bicycle frame, comprising:

a pin extending along a longitudinal axis and having an axial through hole, the pin comprising, at a first free end portion thereof, a threading configured to allow the coupling between the pin and a first arm of a fork of a bicycle frame and, at a second free end portion thereof axially opposite to said first free end portion, a pin head configured to allow the coupling between the pin and a second arm of said fork;

a lever for driving the rotation of the pin about the longitudinal axis;

characterized in that the lever is at least partially housed in the axial through hole, is axially moveable with respect to the pin between a first operative position and a second operative position, and comprises a first lever element and a second lever element pivoted to the first lever element at a pivoting axis perpendicular to the longitudinal axis;

wherein when the lever is in said first operative position the first lever element is entirely housed in the axial through hole and the second lever element is at least partially housed in the axial through hole, and when the lever is in said second operative position the first lever element is at least partially housed in the axial through hole and the second lever element is positioned outside the axial through hole and can be rotated with respect to the first lever element about the pivoting axis;

wherein when said lever is in said second operative position at least one of said first lever element and second lever element is coupled with said pin through a shape coupling.

Advantageously, the device of the invention does not include any cam mechanism. The locking of the pin on the fork of the bicycle thus takes place simply by the effect of the screwing of the pin on an arm of the fork (or on a cap) and of the forced axial abutment of the pin head against the other arm of the fork following the aforementioned screwing. Such screwing is driven by a lever that comprises two lever elements pivoted to each other about a pivoting axis perpendicular to the longitudinal axis of the pin. When the lever is not used, both the aforementioned lever elements are housed inside the pin. When the lever needs to be used, it is partially extracted from the pin until it reaches a position in which the second lever element can be rotated with respect to the first lever element about the aforementioned pivoting axis. In such a position, at least one of the aforementioned lever elements is coupled with the pin through a shape coupling. It is thus possible to achieve a torque transfer between lever and pin following the rotation of the second lever element about the longitudinal axis of the pin. The screwing of the pin is therefore achievable quickly and easily through the use of a single hand (in the case in which the cap is used, it is necessary to hold the cap with the other hand), by acting on the lever with a single finger.

Even more advantageously, the housing of the first and second lever element inside the pin makes allow the axial bulk of the lever with respect to that of the pin when the lever is in its first operative position (i.e. when the lever is not used) to be minimized.

Preferably, the lever comprises a third lever element associated with the second lever element on the opposite side with respect to the first lever element. Such a third lever element in practice performs the function of a service element on which the user can act with the finger of the hand to extract/insert the lever from/into the pin and to drive the lever in rotation about the longitudinal axis of the pin.

Even more preferably, the third lever element is made in one piece with the second lever element and is inclined with respect to the second lever element by a predetermined angle. This allows both quick and easy gripping of the lever through the aforementioned finger in order to extract/insert it axially from/into the pin, and quick and easy pushing of the lever through such a finger in order to rotate it about the aforementioned longitudinal axis.

In the preferred embodiments of the invention, said predetermined angle is equal to about 90°. The Applicant has indeed identified such a particular angle value as being optimal for achieving the minimum axial bulk of the lever with respect to the pin and the desired simplicity of movement of the lever.

In a first preferred embodiment of the present invention, the pin head comprises a seat for housing the second lever element when the lever is in its second operative position and the second lever element is rotated with respect to the first lever element about the aforementioned pivoting axis.

Advantageously, in this case the torque transfer between lever and pin is obtained thanks to the shape coupling between the second lever element and the seat formed in the pin head. The housing of the second lever element in the seat formed in the pin head further allows the axial bulk of the lever with respect to that of the pin when the lever is in its second operative position (i.e. when the lever is used) to be minimized (preferably to be brought to zero).

In a second preferred embodiment of the present invention, the axial through hole comprises, at said pin head, a portion having a non-circular cross section and said first lever element and second lever element have a shape matching that of said portion.

In this case, the torque transfer between lever and pin is achieved thanks to the shape coupling between the first lever element and the aforementioned portion of axial through hole when the lever is in its second operative position.

In a third preferred embodiment of the present invention, the axial through hole comprises at least one portion having a non-circular cross section, said first lever element and second lever element have a shape matching that of the aforementioned portion and the pin head comprises a seat for housing the second lever element when the lever is in its second operative position and the second lever element is rotated with respect to the first lever element about the aforementioned pivoting axis.

In this case, the torque transfer between lever and pin is achieved thanks to both the shape coupling between the first lever element and the aforementioned portion of axial through hole when the lever is in its second operative position and the shape coupling between the second lever element and the seat formed in the pin head.

Preferably, the third lever element is at least partially housed in said seat when the lever is in said first operative position. In this way, the axial bulk of the lever with respect to that of the pin remains minimal (preferably equal to zero) when the lever is not used.

Preferably, the device of the invention comprises at least one retainer for holding the lever in said first operative position. Such a provision makes it possible to avoid the lever to accidentally axially come out from the pin when it is not used.

In first embodiments of the invention, said at least one retainer comprise at least one magnetic element coupled with said lever. Since the pin is made from a metallic material (preferably aluminum), in this case the lever is kept inside the pin thanks to the magnetic attraction exerted by the pin on the aforementioned magnetic element.

Preferably, said magnetic element is housed in a seat formed in the third lever element and is intended to go into abutment against the pin head when the lever is in said first operative position. In this way, the holding action of the lever inside the pin is exerted precisely when the lever is positioned inside the pin.

In second embodiments of the invention, said at least one retainer comprise, alternatively or in addition to the aforementioned magnetic element, a compression spring housed in the axial through hole and having respective free ends in abutment against a flange formed at a free end of the first lever element and an annular abutment wall formed inside the pin close to the pin head, respectively. In this case, the compression spring is housed in rest state inside the pin and is biased to compression when the lever is extracted axially from the pin. The lever is therefore kept inside the pin (possibly in addition to the action exerted by the aforementioned magnetic element) thanks to the elastic reaction force exerted by the compression spring in response to an accidental axial force that would tend to draw the lever axially from the pin.

In further embodiments of the invention, said at least one retainer comprise, alternatively or in addition to the aforementioned magnetic element and/or the aforementioned compression spring, an O-ring in contact with the lever and with an inner surface of the pin when said lever is in said first operative position. In this case, the lever is kept inside the pin (possibly in addition to the action exerted by the aforementioned magnetic element and/or by the aforementioned compression spring) thanks to the friction force exerted by the O-ring on the inner surface of the pin.

Preferably, said O-ring is housed in a recess formed in the lever. Such a provision makes it possible to have a stable positioning of the O-ring on the lever even when the lever is moved to be extracted/inserted from/into the pin.

In the attached Figures, reference numeral 1 indicates a device for mounting a wheel on a bicycle frame in accordance with the present invention. Such a device is also used to dismount the wheel from the frame of the bicycle.

The device 1 comprises a pin 10 extending along a longitudinal axis X. Such a pin 10 is made of a metallic material, preferably aluminum.

In the embodiments illustrated and described herein, the pin 10 is made in a single piece, however alternative embodiments are foreseen in which the pin 10 is made in two or more distinct pieces associated (for example screwed) with each other.

The pin 10 is configured to be inserted in a longitudinal through cavity of a hub body (not shown) of a front or rear wheel of the bicycle to be subsequently stably coupled with a fork of the frame of the bicycle.

The pin 10 preferably has a substantially cylindrical shape and comprises, at a free end portion 10a thereof, an outer threading 11 and, at the free end portion 10b thereof axially opposite to the free end portion 10a, a pin head 12 having an outer diameter greater than that of the remaining part of the pin 10.

The outer threading 11 is configured to be coupled to a matching threading made on an arm of the fork of the frame of the bicycle. Alternatively, the matching threading can be made in a cap configured to go into axial abutment against the aforementioned arm of the fork.

The pin head 12 comprises a surface 12a configured to go into axial abutment against the other arm of the fork at the end of the screwing of the pin 10 into the frame or into the aforementioned cap, as described hereinafter.

Figure 2:
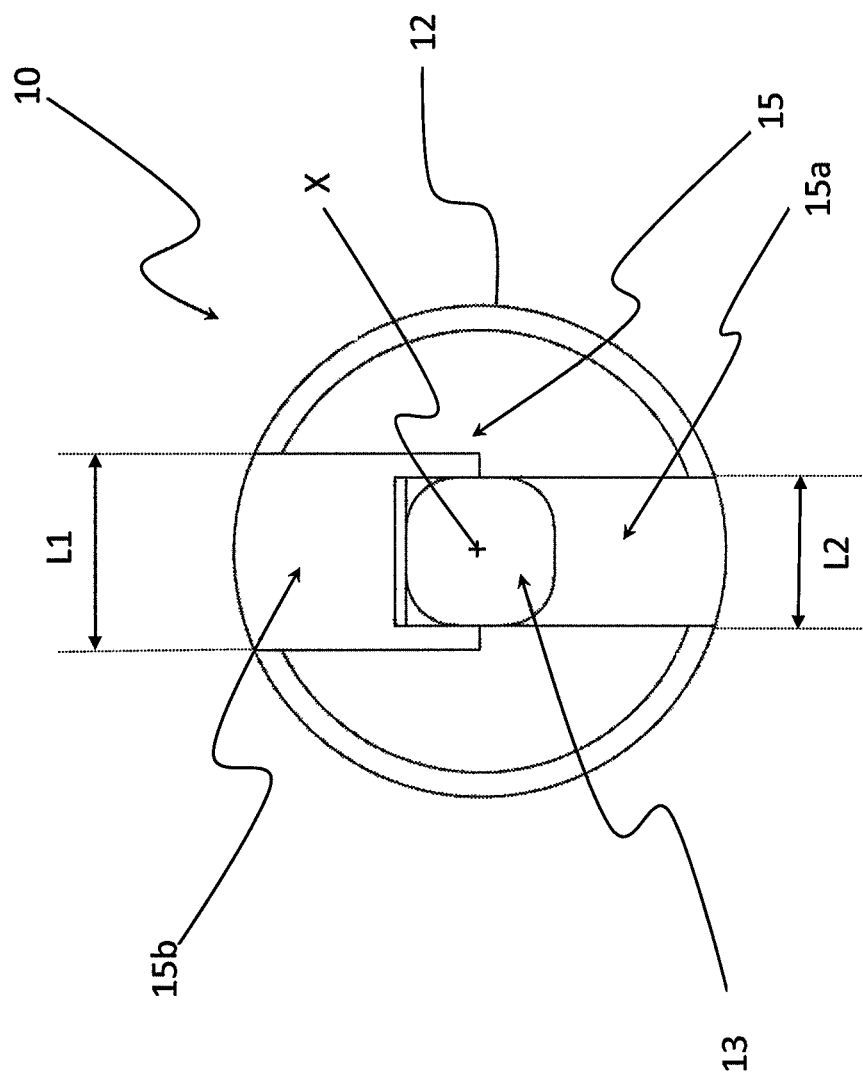
FIG. 2 is a side view of a pin forming part of the device of FIG. 1.
Figure 3:
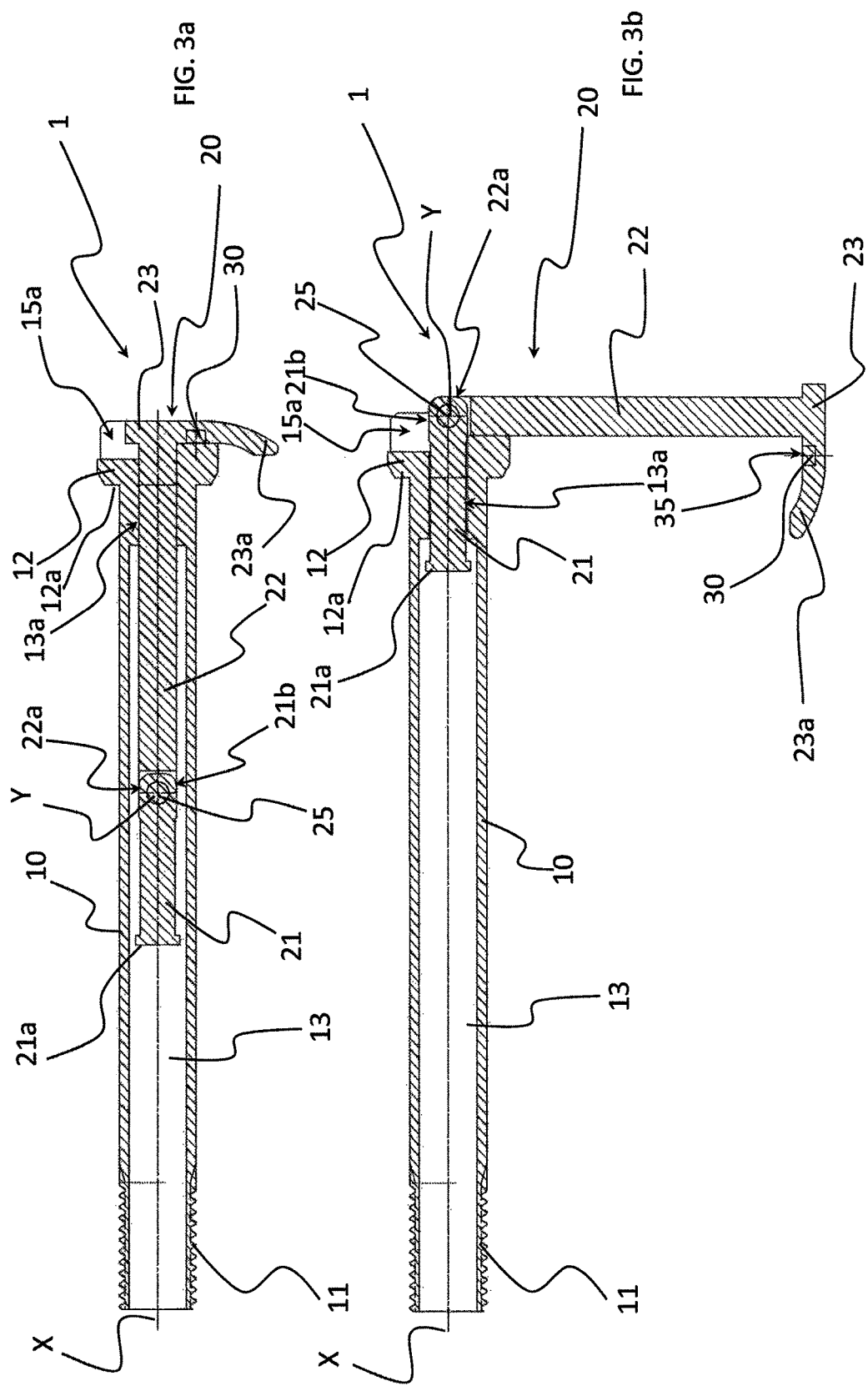
FIGS. 3a and 3b are longitudinal section views of a first embodiment of the device of FIG. 1 in two different operative configurations.
Figure 4:
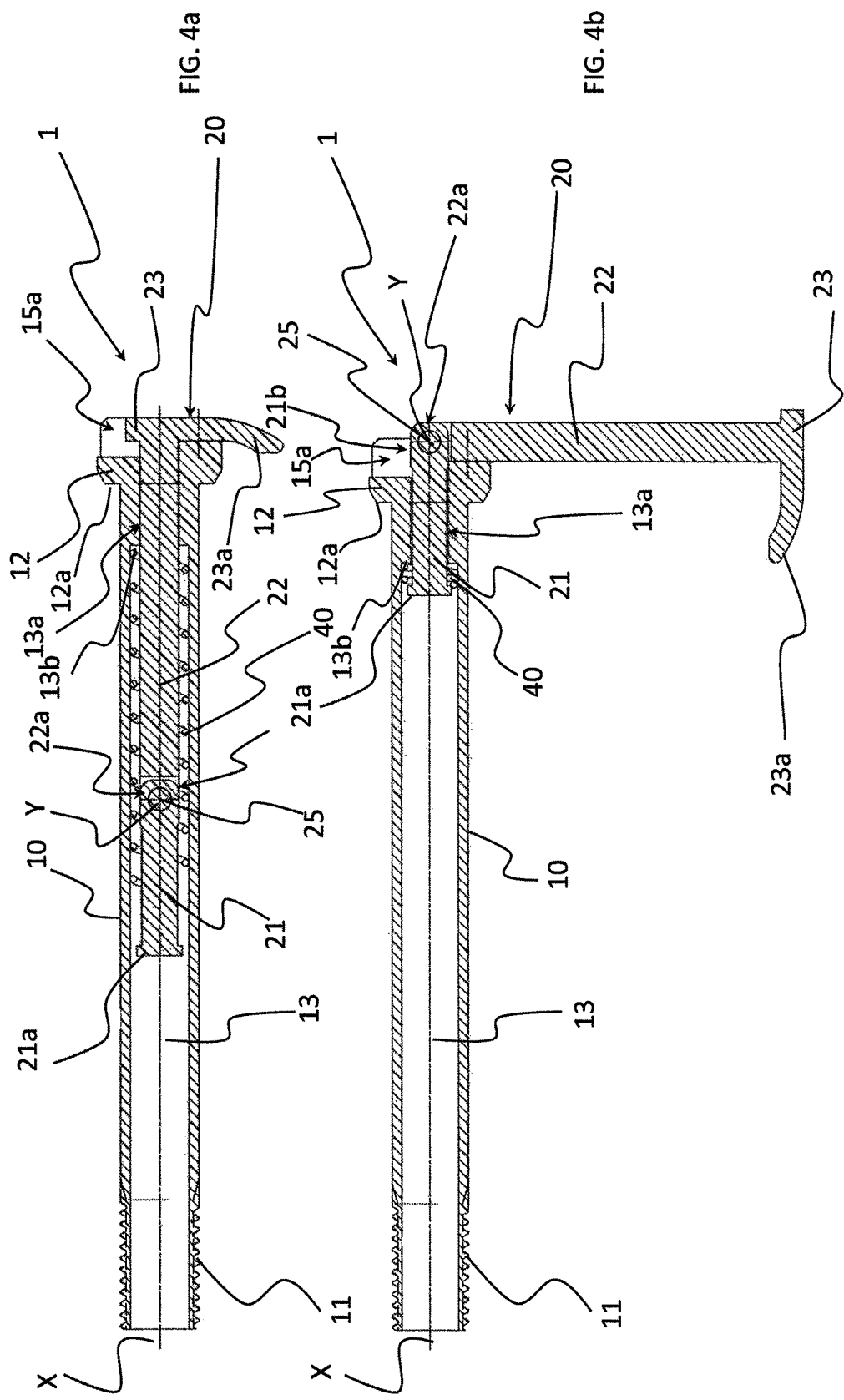
FIGS. 4a and 4b are longitudinal section views of a second embodiment of the device of FIG. 1 in two different operative configurations.
Figure 5:
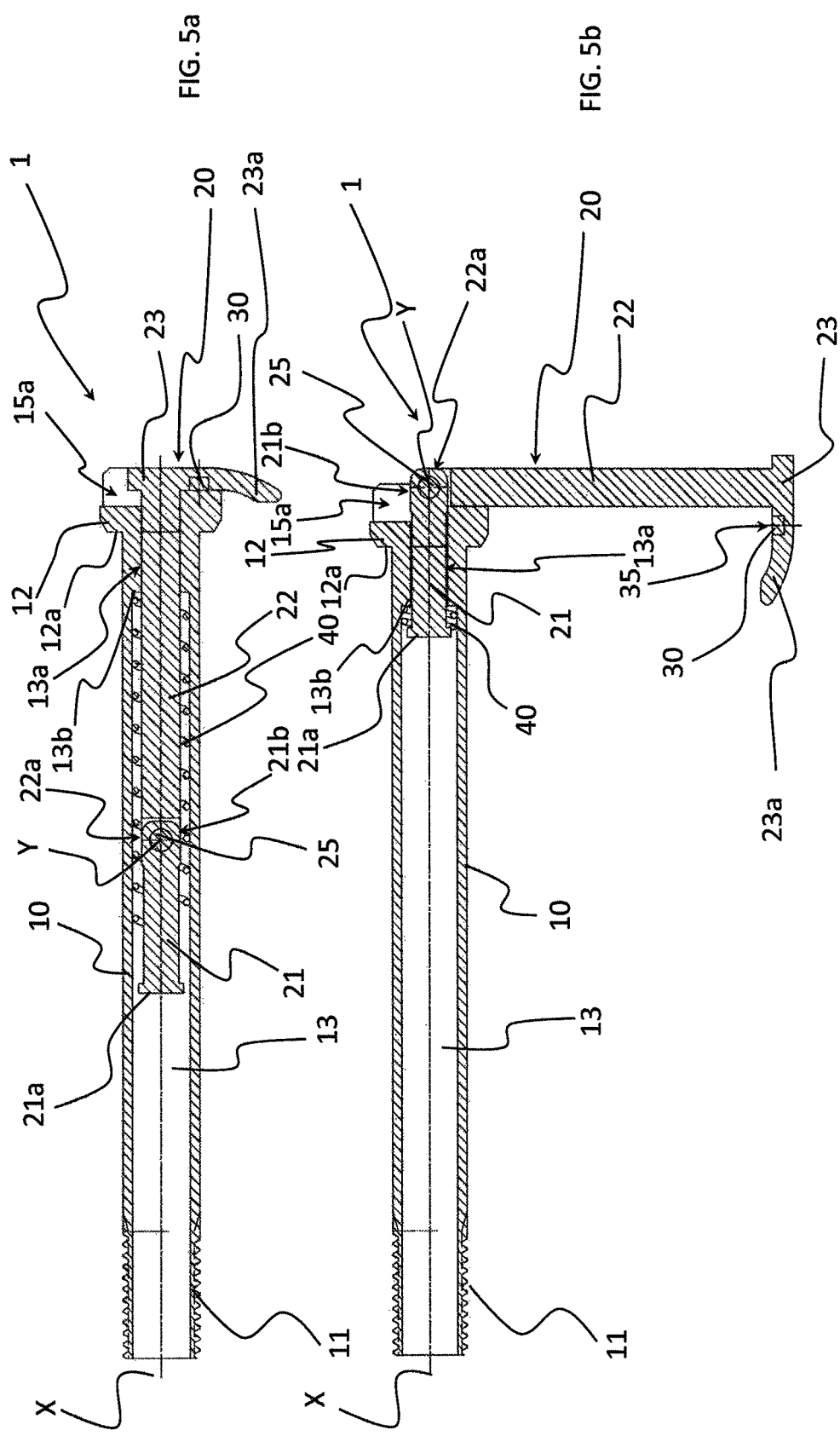
FIGS. 5a and 5b are longitudinal section views of a third embodiment of the device of FIG. 1 in two different operative configurations.
Figure 6:
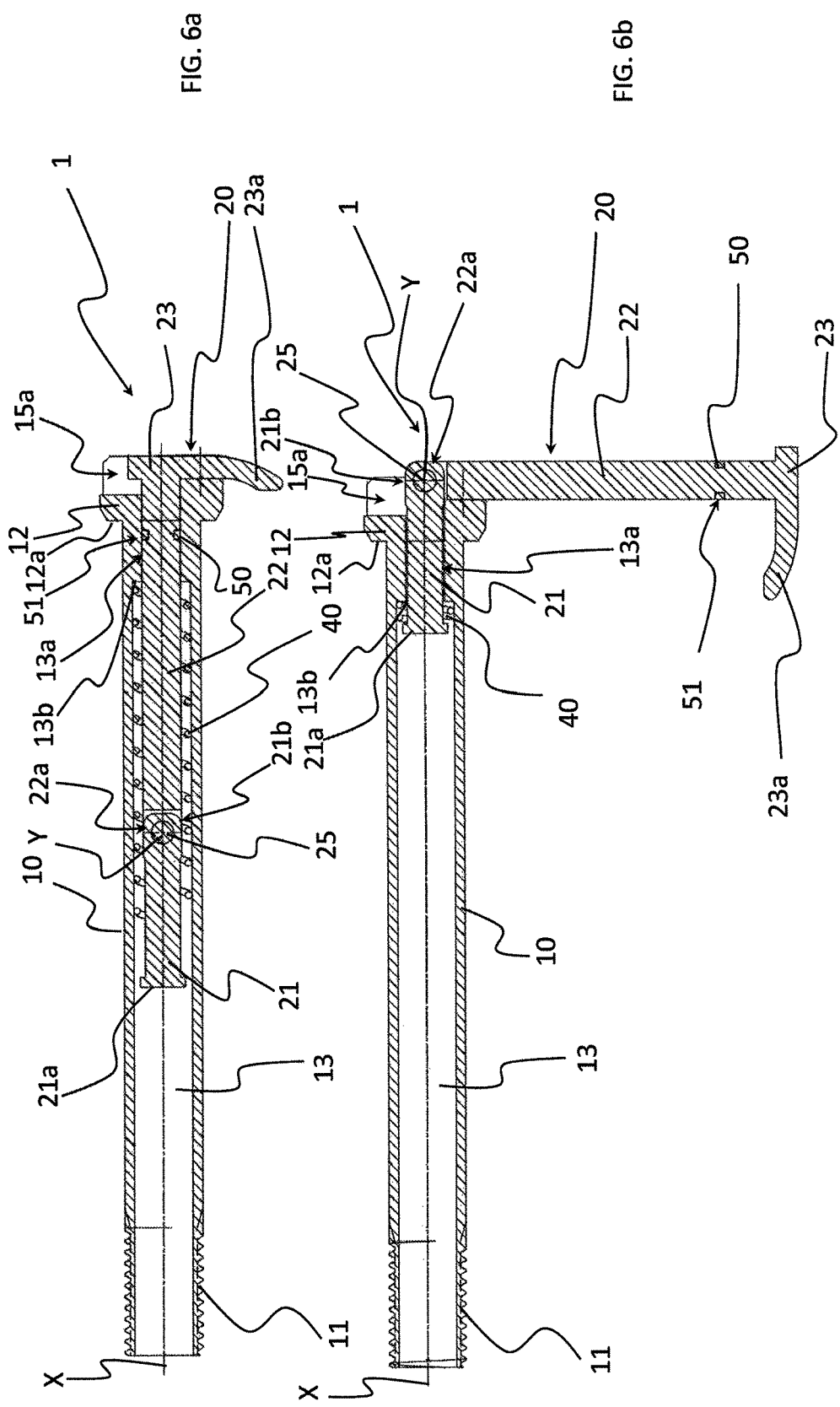
FIGS. 6a and 6b are longitudinal section views of a fourth embodiment of the device of FIG. 1 in two different operative configurations.

As shown in FIG. 2, the pin 10 comprises an axial through hole 13.

In the embodiments shown and described herein, such an axial through hole 13 comprises, at an end portion thereof proximal to the pin head 12, a portion 13a having a non-circular cross section of reduced width with respect to that of the remaining part of the axial through hole 13 (FIG. 2). In the example shown herein, such a portion 13a has a quadrangular cross section, however sections having a shape different from the one shown can be foreseen.

The portion 13a defines inside the pin 10 an annular abutment wall 13b (FIGS. 4a, 4b, 5a, 5b, 6a, 6b).

In the embodiment shown in FIGS. 1-7, the axial through hole 13 opens into the pin head 12 inside a seat 15. Such a seat 15 is preferably defined by a groove having opposite flat walls and extending along a direction perpendicular to the longitudinal axis X.

Preferably, as shown in FIGS. 2-7, the seat 15 comprises a first seat portion 15a having a predetermined axial depth and a second seat portion 15b having an axial depth smaller than that of the first seat portion 15a. As shown in FIG. 2, the first seat portion 15a further has a width L1 (defined as the distance of the opposite walls of the groove) slightly greater than that of the second seat portion 15b. The latter has a width L2 substantially equal to that of the portion 13a of the axial through hole 13.

The device 1 of the invention further comprises a lever 20 for driving the rotation of the pin 10 about the longitudinal axis X. In FIG. 2 such a lever 20 is not shown.

The lever 20 is housed in the inner through hole 13 of the pin 10 and is axially moveable with respect to the pin 10 between a first operative position (rest or non-use position of the lever 20) shown in FIGS. 1, 3a, 4a, 5a, 6a and 7 and a second operative position (working or use position of the lever 20) shown in FIGS. 3b, 4b, 5b, 6b.

The lever 20 is made of a metallic material (preferably aluminum) or a composite material (preferably carbon or glass fiber).

The lever 20 is defined by many lever elements coupled to each other. In particular, the lever 20 comprises a first lever element 21, a second lever element 22 pivoted to the first lever element 21 and a third lever element 23 made in one piece with the second lever element 22 and arranged on the opposite side with respect to the first lever element 21.

Figure 9:
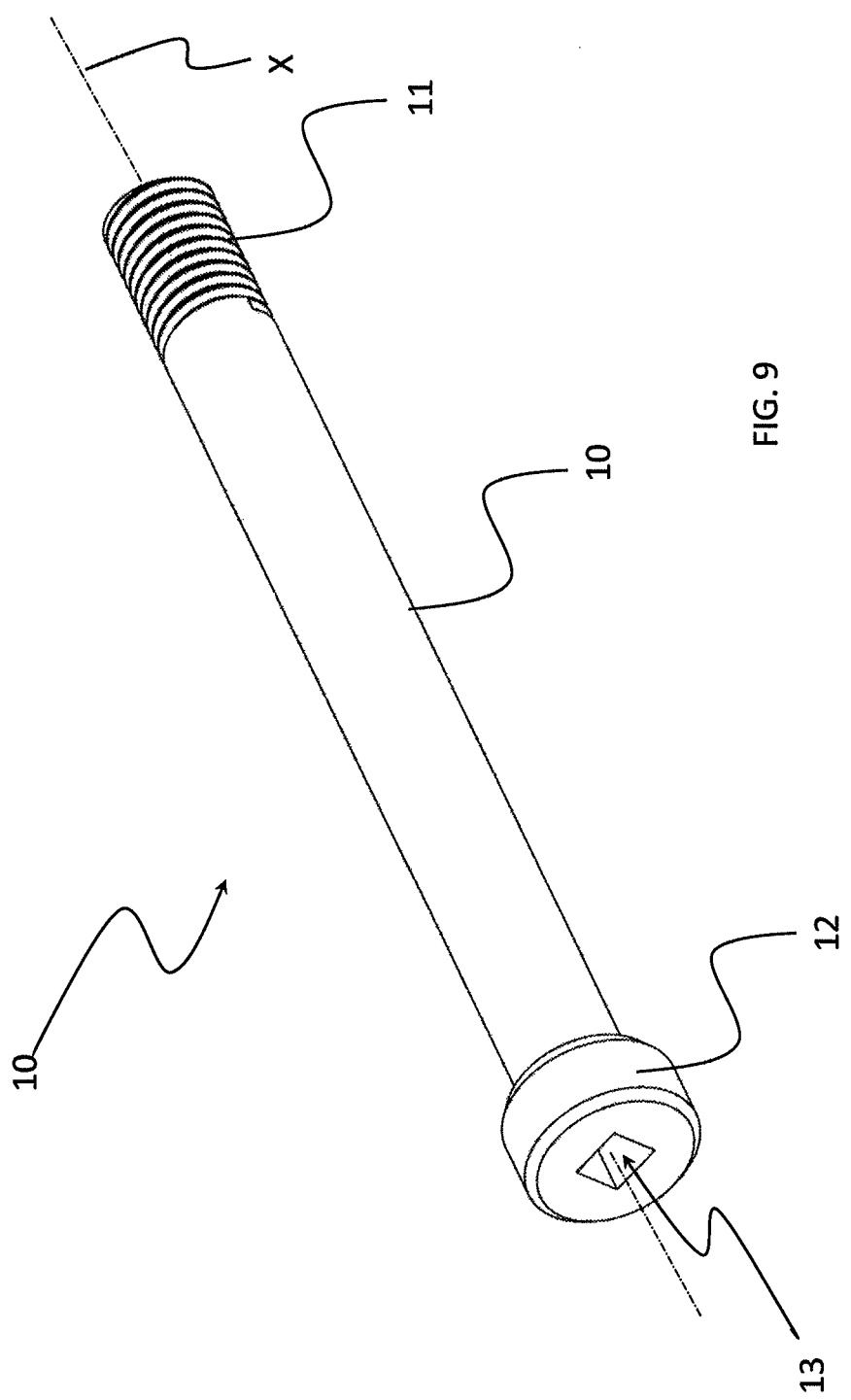
FIG. 9 is a perspective view of a pin forming part of the device of FIG. 8.
Figure 10:
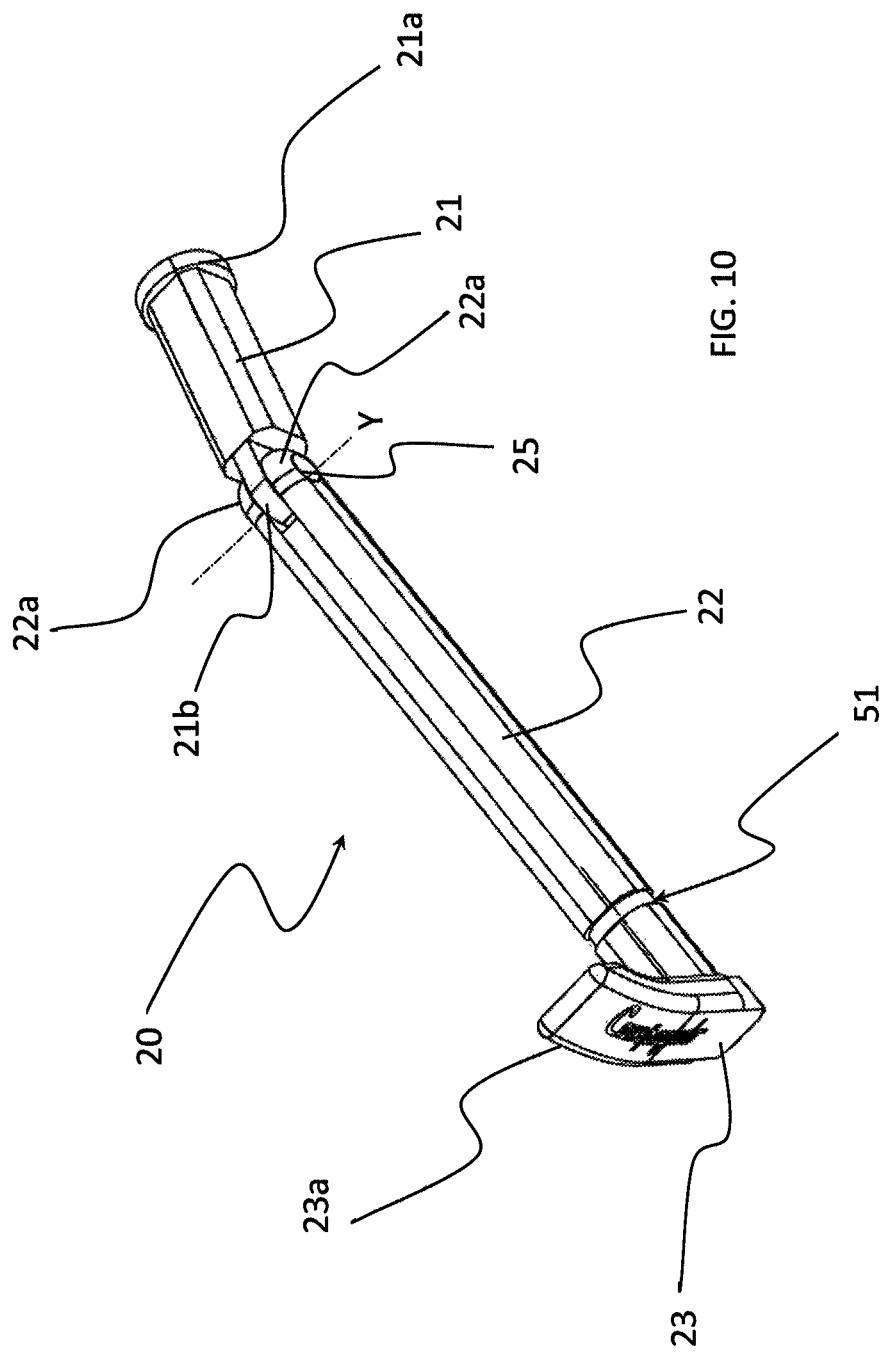
FIG. 10 is a perspective view of a lever forming part of the device of FIG. 8.
Figure 11:
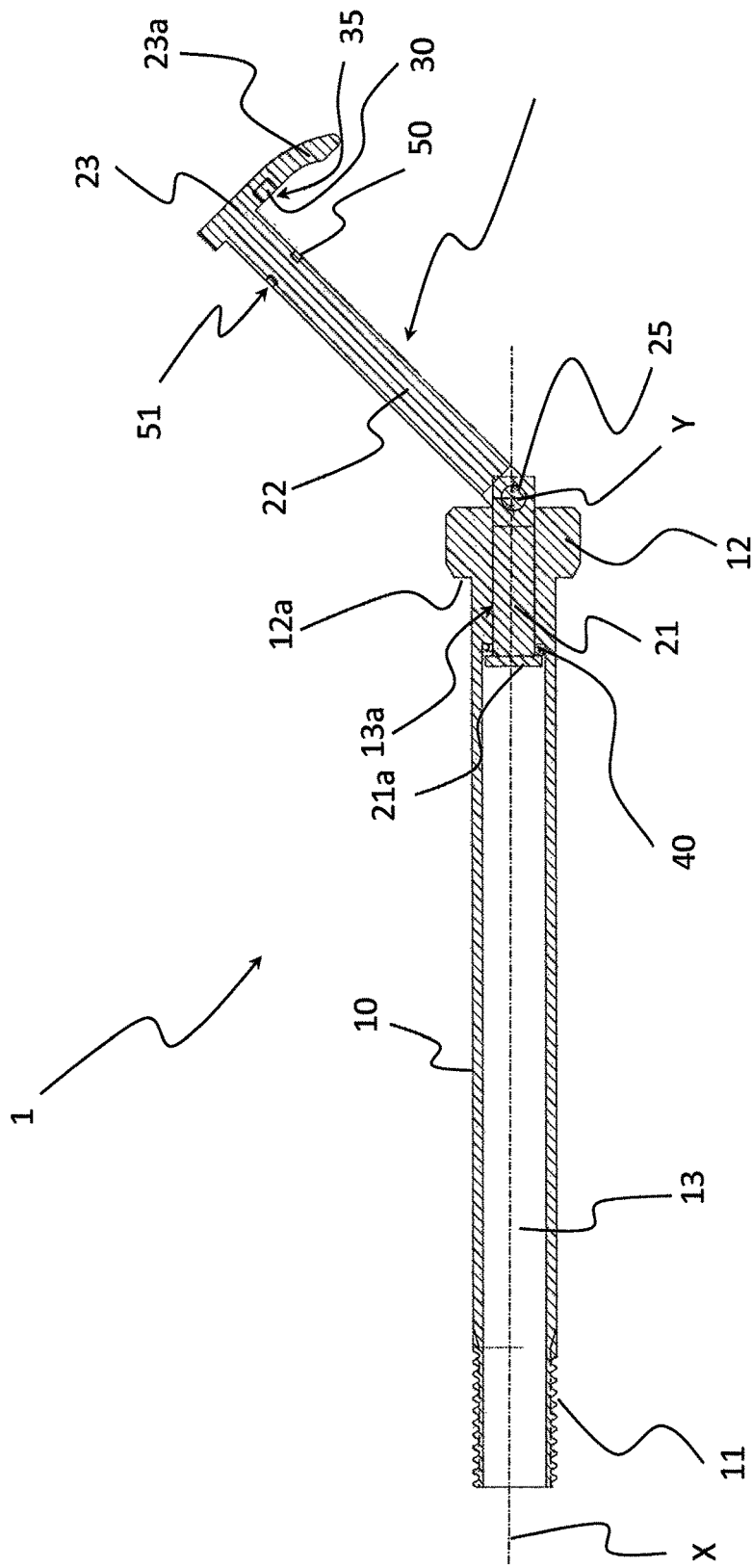
FIG. 11 is a longitudinal section view of the device of FIG. 8 in an operative configuration thereof.

The lever elements 21 and 22 preferably have a non-circular cross section, more preferably with a shape matching that of the portion 13a of the axial through hole 13. Such a lever 20 is shown in FIG. 9.

The lever element 21 comprises, at a free end axially opposite with respect to the second lever element 22, a flange 21a and, at a free end portion 21b thereof axially opposite to the flange 21a and adjacent to the second lever element 22, a hole that houses a coupling pin 25 extending along a pivoting axis Y perpendicular to the longitudinal axis X.

The lever element 22 comprises, at a free end portion thereof adjacent to the first lever element 21, a pair of walls 22a coupled with the free end portion 21b of the first lever element 21 and provided with respective coupling seats which couple with the coupling pin 25.

In an alternative embodiment that is not shown, the hole that houses the coupling pin 25 is made in the lever element 22 and the pair of walls 22a are made in the first lever element 21.

As already stated, the lever element 23 is made in one piece with the lever element 22. The lever element 23 can, however, be made in a distinct piece from the lever element 22 and be coupled with the latter through a further coupling pin.

In the embodiments shown, the lever element 23 extends along a direction inclined by about 90° with respect to the lever element 22 and has an arched end portion 23a.

As shown in FIGS. 1, 3a, 4a, 5a, 6a, 7, when the lever 20 is in its rest position, the lever elements 21 and 22 are aligned along the longitudinal axis X and housed in the axial through hole 13. In particular, the lever element 21 is entirely housed in the axial through hole 13 and the lever element 22 is housed in the axial through hole 13 and projects in the seat 15 formed in the pin head 12. The lever element 23 is housed in the seat 15 of the pin head 12 (in particular in the second seat portion 15b) so as not to project axially with respect to the pin head 12 (or to project by a portion of negligible length). In such a rest position, the end portion 23a projects with respect to the pin head 12 along a direction perpendicular to the longitudinal axis X.

As shown in FIGS. 3b, 4b, 5b, 6b, when the lever 20 is in its working position, a part of the lever element 21 is housed in the portion 13a of the axial through hole 13 and a different part of the lever element 21 projects in the seat 15. The lever element 22 projects axially with respect to the portion 13a of the axial through hole 13 and, following a rotation about the pivoting axis Y, is inclined with respect to the first lever element 21 and housed in the seat 15. In such a working position, by applying a torque to the second lever element 22 through a lateral thrust on the third lever element 23 the second lever element 22 is made to rotate about the longitudinal axis X and the torque is transferred to the pin 10, with consequent screwing of the threading 11 in the threaded hole made on the arm of the fork or in the cap. The rotation of the second lever element 22 with respect to the first lever element 21 about the pivoting axis Y is obtainable thanks to the fact that when the lever 20 is in its working position the coupling pin 25 projects axially with respect to the portion 13a of the axial through hole 13.

In the positions shown in FIGS. 3b, 4b, 5b, 6b, the lever 20 projects axially from the pin 10 by a limited portion (about 1 cm). However, embodiments are foreseen in which such axial projection is zero.

In preferred embodiments thereof, the device 1 of the invention also comprises a retainer for holding the lever 20 in the rest position of FIGS. 1, 3a, 4a, 5a, 6a and 7.

In the embodiment shown in FIGS. 3a and 3b, such retainer is defined by a magnetic element 30 housed with interference in a seat 35 formed in the third lever element 23. When the lever 20 is in its rest position (FIG. 3a), the magnetic element 30 is in abutment against the pin head 12. In order to take the lever 20 into its working position of FIG. 4b, it is necessary to exert on the end portion 23a of the third lever element 23 an axial force of greater magnitude with respect to the magnetic attraction force exerted on the magnetic element 30 by the metallic material from which the pin 10 is made. Such a magnetic attraction force keeps the lever 20 inside the pin 10 when the lever 20 is not used.

In embodiments that are not shown, a magnetic element is also provided in the pin 12. In particular, such a magnetic element is housed with interference in a seat formed in the pin head 12 in a position such as to face the magnetic element 30 when the lever 20 is in the rest position.

In the alternative embodiment shown in FIGS. 4a and 4b, the aforementioned retainer is defined by a compression spring 40 housed in the axial through hole 13 and having respective free ends in abutment against the flange 21a of the first lever element 21 and the annular abutment wall 13b of the pin 10, respectively. In the rest position of FIG. 4a, the compression spring 40 is in a rest condition. In order to take the lever 20 into its working position of FIG. 4b, it is necessary to exert on the end portion 23a of the third lever element 23 an axial force of greater magnitude with respect to the elastic reaction exerted by the compression spring 40. Such an elastic reaction keeps the lever 20 inside the pin 10 when the lever 20 is not used.

FIGS. 5a and 5b shown a further alternative embodiment that includes both the magnetic element 30 described above with reference to FIGS. 3a, 3b and the compression spring 40 described above with reference to FIGS. 4a and 4b.

In the alternative embodiment shown in FIGS. 6a and 6b, the aforementioned retainer includes, in addition to the compression spring 40 described above with reference to FIGS. 4a and 4b, an O-ring 50 housed with interference in a recess 51 preferably formed in the second lever element 22, in particular in an axial portion of the second lever element 22 that is positioned at the portion 13a of the axial through hole 13 when the lever 20 is in its rest position (FIG. 6a). The O-ring 50 contacts the inner surface of the pin 10 at the portion 13a when the lever 20 is in its rest position of FIG. 6a and slides on the inner surface of the pin 10 at the portion 13a when the lever 20 is brought into its working position of FIG. 6b. In order to bring the lever 20 into its working position of FIG. 6b, it is necessary to exert on the end portion 23a of the third lever element 23 an axial force of greater magnitude with respect both to the elastic reaction exerted by the compression spring 40 and to the friction force exerted by the O-ring 50 on the inner surface of the pin 10 at the portion 13a. Such a friction force contributes to keep the lever 20 inside the pin 10 when the lever 20 is not used.

Figure 7:
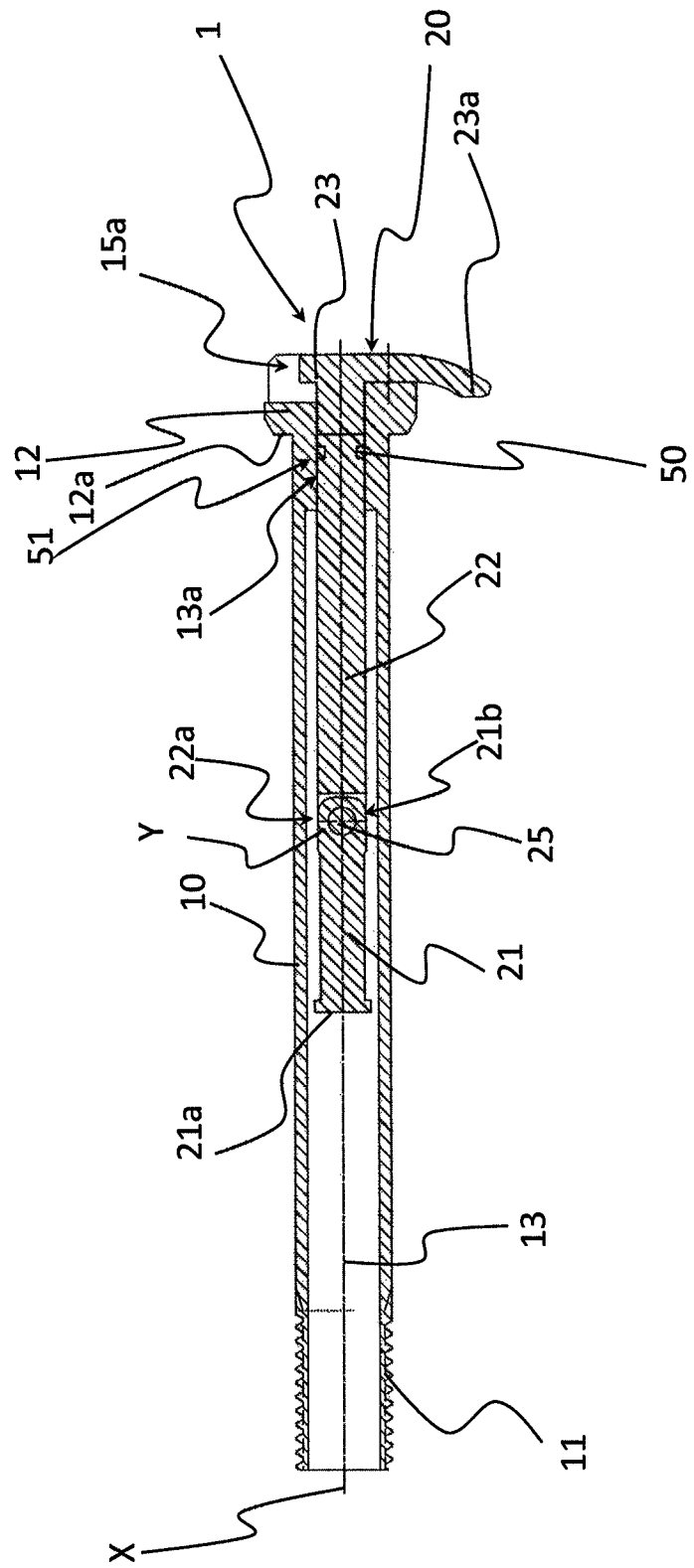
FIG. 7 is a longitudinal section view of a fifth embodiment of the device of FIG. 1 in an operative configuration thereof.
Figure 8:
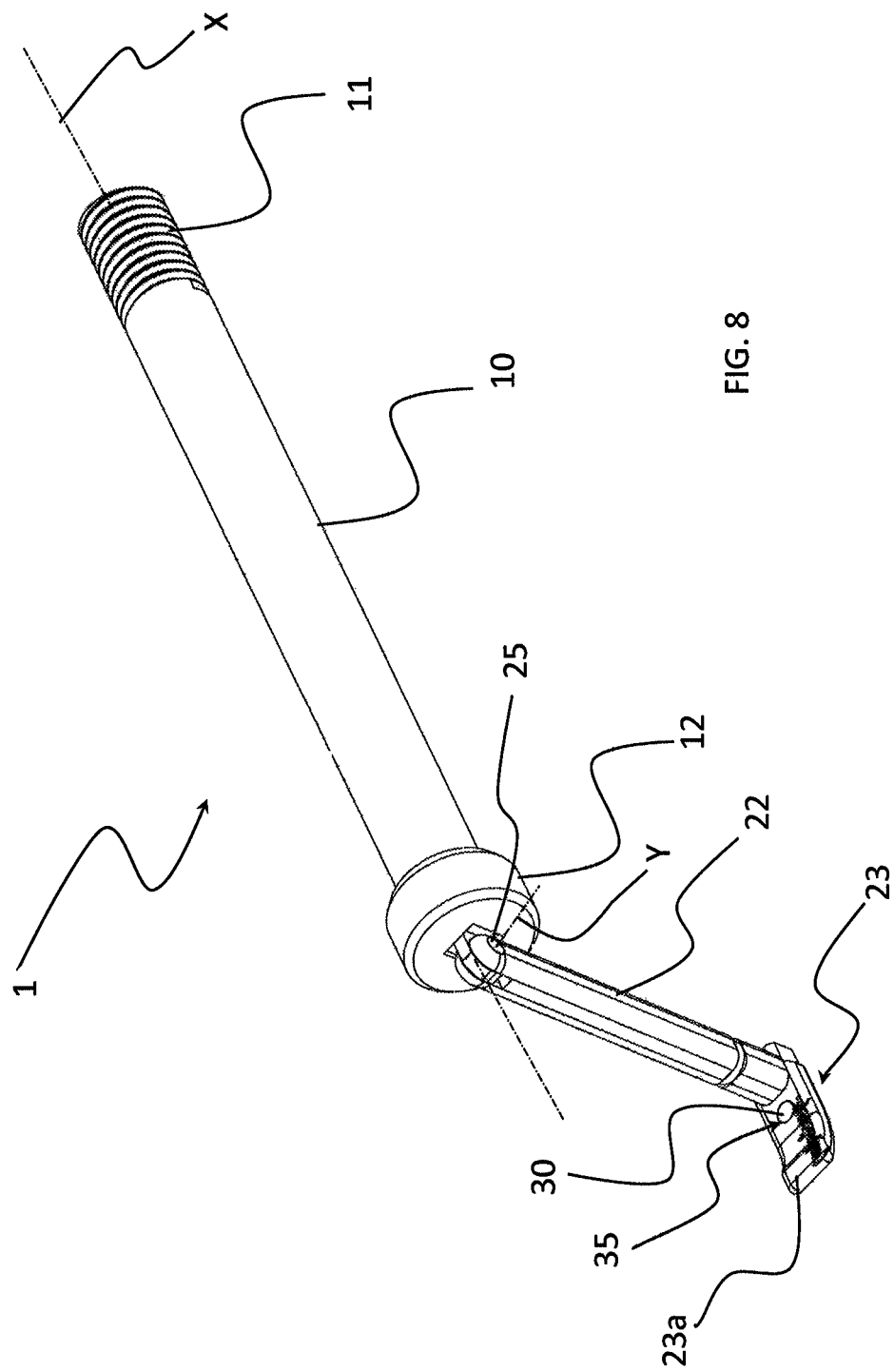
FIG. 8 is a perspective view of a second preferred embodiment of a device for mounting a wheel on a bicycle frame, such a device being in accordance with the present invention.

In the alternative embodiment shown in FIG. 7, in order to hold the lever 20 in its rest position (FIG. 7a) only the O-ring 50 described above with reference to FIGS. 6a, 6b is used.

Further embodiments are provided in which the O-ring 50 described above is used in combination with the elastic element 30 described with reference to FIGS. 3a, 3b, possibly also together with the compression spring 40 described with reference to FIGS. 4a and 4b.

When the hub body is assembled by inserting the pin 10 therein, the lever 20 is in its rest position shown in FIGS. 1, 3a, 4a, 5a, 6a and 7.

When the wheel (comprising the hub body thus assembled) must be mounted on the frame of the bicycle, the user firstly positions the hub body between the arms of the fork and brings such arms into contact with the end portions 10a, 10b of the pin 10. After (or before) such an operation, the user takes the lever 20 into the working position of FIGS. 3b, 4b, 5b, 6b. This happens firstly by pulling the lever 20 with a finger, acting in particular on the end portion 23a of the lever element 23, and then rotating the second lever element 22 with respect to the first lever element 21 about the pivoting axis Y and positioning the second lever element 22 in the seat 15 formed on the pin head 12. At this point, the user, again acting with a finger on the aforementioned end portion 23a, rotates the second lever element 22 about the longitudinal axis X, driving the pin 10 in rotation and screwing the threading 11 on the arm of the fork (or on the cap), thus bringing the abutment surface 12a of the pin head 12 in forced axial abutment against the other arm of the fork. Once screwing is complete, the wheel is stably mounted on the frame of the bicycle. The user then takes the lever back into the rest position of FIGS. 1, 3a, 4a, 5a, 6a and 7 by firstly aligning the second lever element 22 with the first lever element 21 and then pushing the lever 20 inside the pin 10 (by acting on the third lever element 23).

The retainers 30, 40, 50 described above ensure that the lever 20 is kept in the rest position of FIGS. 1, 3a, 4a, 5a, 6a and 7 during the use of the bicycle.

In order to remove the wheel from the frame of the bicycle, the user brings the lever 20 into the working positions of FIGS. 3b, 4b, 5b, 6b by carrying out the same operations described above of extraction of the lever 20 from the pin 10 and positioning the second lever element 22 in the seat 15 formed in the pin head 12. Then, by acting with a finger on the aforementioned end portion 23a, the user rotates the second lever element 22 about the longitudinal axis X, thus driving the pin 10 in rotation and unscrewing the threading 11 from the arm of the fork (or from the cap), simultaneously loosening the axial abutment between pin head 12 and arm of the fork. The user can thus remove the wheel from the frame of the bicycle.

FIGS. 8-11 show a further alternative embodiment of the device 1 of the present invention. In such figures, analogous elements to those described above are indicated with the same reference numeral and will not be described again.

The embodiment shown in FIGS. 8-11 differs from those shown in FIGS. 1-7 and described above in that the seat 15 is not made in the pin head 12. In this case, the end portion 13a of the axial through hole 13 extends up to the axially outer face of the pin head 12, as shown in FIG. 9.

The embodiment shown in FIGS. 8-11 comprises all of the retainers 30, 40, 50 described above. However, alternative embodiments to the one shown in FIGS. 8-11 are provided in which there is only one or only a few of the aforementioned retainers 30, 40, 50.

The device 1 of FIGS. 8-11 is used in an identical manner to what is described above with reference to FIGS. 1-7. The only difference is that, when the lever 20 is in the rest position, the lever element 23 is in abutment on the axially outer face of the pin head 12 and, when the user has taken the lever 20 into the working position of FIGS. 8 and 11 by pulling the lever 20 with a finger (acting in particular on the end portion 23a of the lever element 23), the coupling pin 25 projects axially with respect to the pin head 12, allowing the user to rotate the lever element 22 with respect to the lever element 21 about the pivoting axis Y. In this case, even a minimal relative rotation between lever element 22 and lever element 21 is sufficient to allow the user, again acting with a finger on the aforementioned end portion 23a, to rotate the second lever element 22 about the longitudinal axis X, driving the pin 10 in rotation thanks to the shape coupling between portion 13a of the axial through hole 13 and lever element 21.

Of course, those skilled in the art can bring numerous modifications and variants to the present invention, in order to satisfy specific and contingent requirements, all of which are in any case within the scope of protection defined by the following claims.

What is claimed is:

1. A device for mounting a wheel on a bicycle frame, comprising:
    a pin extending along a longitudinal axis (X) and having an axial through hole, said pin comprising, at a first free end portion thereof, a threading configured to allow coupling between said pin and a first arm of a fork of a bicycle frame and, at a second free end portion thereof axially opposite to said first free end portion, a pin head configured to allow coupling between said pin and a second arm of said fork;
    a lever for driving rotation of said pin about said longitudinal axis (X);
    wherein said lever is at least partially housed in said axial through hole, is axially moveable with respect to said pin between a first operative position and a second operative position, and comprises a first lever element and a second lever element pivoted to said first lever element at a pivoting axis (Y) perpendicular to said longitudinal axis (X); and,
    wherein when said lever is in said first operative position said first lever element is entirely housed in said axial through hole and said second lever element is at least partially housed in said axial through hole, and when said lever is in said second operative position said first lever element is at least partially housed in said axial through hole and said second lever element is positioned outside said axial through hole and can be rotated with respect to said first lever element about said pivoting axis (Y); and,
    wherein when said lever is in said second operative position at least one of said first lever element and second lever element is coupled with said pin through a shape coupling.

2. The device according to claim 1, wherein said lever comprises a third lever element associated with said second lever element on the opposite side with respect to said first lever element.

3. The device according to claim 2, wherein said third lever element is made in one piece with said second lever element and is inclined with respect to said second lever element by a predetermined angle.

4. The device according to claim 3, wherein said predetermined angle is equal to about 90°.

5. The device according to claim 1, wherein said pin head comprises a seat for housing said second lever element when the lever is in its second operative position and said second lever element is rotated with respect to said first lever element about said pivoting axis (Y).

6. The device according to claim 5, wherein said lever comprises a third lever element associated with said second lever element on the opposite side with respect to said first lever element, wherein said third lever element is at least partially housed in said seat when said lever is in said first operative position.

7. The device according to claim 1, wherein said axial through hole comprises, at said pin head, a portion having a non-circular cross section and said first lever element and second lever element have a shape matching that of said portion.

8. The device according to claim 1, further comprising at least one retainer for holding said lever in said first operative position.

9. The device according to claim 8, wherein said at least one retainer comprises at least one magnetic element coupled with said lever.

10. The device according to claim 9, wherein said lever comprises a third lever element associated with said second lever element on the opposite side with respect to said first lever element, wherein said magnetic element is housed in a seat formed in said third lever element and is intended to go into abutment against said pin head when said lever is in said first operative position.

11. The device according to claim 8, wherein said at least one retainer comprises a compression spring housed in said axial through hole and having respective free ends in abutment against a flange formed at a free end of said first lever element and an annular abutment wall formed inside said pin close to said pin head, respectively.

12. The device according to claim 8, wherein said at least one retainer comprises an O-ring in contact with said lever and with an inner surface of said pin when said lever is in said first operative position.

13. The device according to claim 12, wherein said O-ring is housed in a recess formed in said lever.

* * * * *